United States Patent
Mugurusa et al.

(10) Patent No.: US 11,713,718 B2
(45) Date of Patent: Aug. 1, 2023

(54) DUAL VALVE FLUID METERING SYSTEM

(71) Applicant: Hamilton Sundstrand Corporation, Charlotte, NC (US)

(72) Inventors: Diego S. Mugurusa, North Haven, CT (US); Jesse Joseph Stieber, Avon, CT (US); Jeffrey S. Dearborn, Windsor Locks, CT (US); David D. Frish, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/490,082

(22) Filed: Sep. 30, 2021

(65) Prior Publication Data

US 2023/0101637 A1  Mar. 30, 2023

(51) Int. Cl.
*F02C 7/232* (2006.01)
*F02C 7/228* (2006.01)
*F02C 9/38* (2006.01)
*F02C 9/26* (2006.01)

(52) U.S. Cl.
CPC .............. *F02C 7/232* (2013.01); *F02C 7/228* (2013.01); *F02C 9/263* (2013.01); *F02C 9/38* (2013.01); *F05D 2260/601* (2013.01)

(58) Field of Classification Search
CPC .............. F02C 7/232; F02C 9/263; F02C 9/38
See application file for complete search history.

(56) References Cited

U.S. PATENT DOCUMENTS

| | | | |
|---|---|---|---|
| 6,079,198 A | 6/2000 | Prowse et al. | |
| 6,272,843 B1 * | 8/2001 | Schwamm | F02C 9/263 60/39.281 |
| 7,080,503 B2 * | 7/2006 | Griffiths | F02C 9/263 60/243 |
| 7,610,760 B2 * | 11/2009 | Clements | F02C 9/46 60/773 |
| 8,276,360 B2 | 10/2012 | Poisson et al. | |
| 8,302,406 B2 | 11/2012 | Baker | |
| 8,523,537 B2 | 9/2013 | Garry | |
| 8,549,863 B2 * | 10/2013 | Brocard | F02C 9/28 60/779 |

(Continued)

FOREIGN PATENT DOCUMENTS

FR   3053396 A1   1/2018

OTHER PUBLICATIONS

European Search Report for European Application No. 22179271.6; dated Dec. 5, 2022; 5 pages.

*Primary Examiner* — Kevin F Murphy
(74) *Attorney, Agent, or Firm* — Cantor Colburn LLP

(57) ABSTRACT

A flow metering system includes a pump configured to urge a fluid flow from a fluid source, and a recirculation line located at the pump. A pressure regulating valve is located along the recirculating line. One or more fluid delivery lines extend downstream of the pump to deliver the fluid flow to one or more fluid consumers. A flow control valve is located along each fluid delivery line of the one or more fluid delivery lines. A system controller is operably connected to the pressure regulating valve and the one or more flow control valves. The system controller is configured to maintain a selected delta pressure and a selected flow rate of the fluid flow by operation of the pressure regulating valve and the one or more flow control valves.

20 Claims, 3 Drawing Sheets

(56) References Cited

U.S. PATENT DOCUMENTS

| | | |
|---|---|---|
| 8,919,094 B2 | 12/2014 | Haugsjaahabink |
| 9,334,840 B2 | 5/2016 | Baker |
| 10,294,866 B2 | 5/2019 | Baker |
| 2012/0042657 A1 | 2/2012 | Hodinot et al. |
| 2016/0053689 A1 | 2/2016 | Morton |
| 2017/0292457 A1* | 10/2017 | Selstad .................... F02C 9/44 |
| 2018/0157279 A1* | 6/2018 | Ganowsky ............. F16K 31/06 |
| 2018/0163637 A1 | 6/2018 | Giffiths |
| 2018/0372006 A1* | 12/2018 | Chalaud ................... F02C 9/38 |
| 2021/0239054 A1 | 8/2021 | Reuter et al. |

\* cited by examiner

DUAL VALVE FLUID METERING SYSTEM

This invention was made with Government support awarded by the United States. The Government has certain rights in the invention.

BACKGROUND

Exemplary embodiments pertain to the art of flow metering and management, in particular applications that have the need for fluid flow to be metered very accurately, with fast response time, and over a large range of fluid flow rates and pressure differentials. Examples of such applications include jet engine fuel control systems and pump assisted rocket engine propulsion systems.

BRIEF DESCRIPTION

In one embodiment, a flow metering system includes a pump configured to urge a fluid flow from a fluid source, and a recirculation line located at the pump. A pressure regulating valve is located along the recirculating line. One or more fluid delivery lines extend downstream of the pump to deliver the fluid flow to one or more fluid consumers. A flow control valve is located along each fluid delivery line of the one or more fluid delivery lines. A system controller is operably connected to the pressure regulating valve and the one or more flow control valves. The system controller is configured to maintain a selected delta pressure and a selected flow rate of the fluid flow by operation of the pressure regulating valve and the one or more flow control valves.

Additionally or alternatively, in this or other embodiments a delta pressure sensor is located at each flow control valve to measure a delta pressure across each flow control valve.

Additionally or alternatively, in this or other embodiments the system controller is configured to adjust a position of the pressure regulating valve based on a comparison of the measured delta pressure to the selected delta pressure.

Additionally or alternatively, in this or other embodiments a flow meter is located along each fluid delivery line of the one or more fluid delivery lines to measure a flow rate of the fluid along each fluid deliver line.

Additionally or alternatively, in this or other embodiments the system controller is configured to adjust a position of the one or more flow control valves based on a comparison of the measured flow rate to the selected flow rate.

Additionally or alternatively, in this or other embodiments the flow meter is located along each fluid delivery line between the pump and the flow control valve.

Additionally or alternatively, in this or other embodiments the pump is a variable speed pump.

Additionally or alternatively, in this or other embodiments the system controller is operably connected to the pump and is configured to vary a speed of the pump to maintain the selected flow rate.

Additionally or alternatively, in this or other embodiments a heat exchanger is located along the recirculation line to cool the fluid flow in the recirculation line.

Additionally or alternatively, in this or other embodiments the pressure regulating valve and the one or more flow control valves are proportional solenoid valves.

In another embodiment, a method of metering a fluid flow between a fluid source and one or more fluid consumers includes urging the fluid flow from the fluid source via a pump, a recirculation line located at the pump and including a pressure regulating valve. The fluid flow is directed along one or more fluid delivery lines from the pump toward the one or more fluid consumers. Each fluid delivery line includes a flow control valve. A position of the pressure regulating valve is adjusted via a system controller to maintain a selected delta pressure across the one or more flow control valves, and a position of the one or more flow control valves is adjusted via the system controller to maintain a selected flow rate of the fluid flow along the one or more fluid delivery lines.

Additionally or alternatively, in this or other embodiments a delta pressure is measured across each flow control valve via a delta pressure sensor located at each flow control valve.

Additionally or alternatively, in this or other embodiments the position of the pressure regulating valve is adjusted based on a comparison of the measured delta pressure to the selected delta pressure by the system controller.

Additionally or alternatively, in this or other embodiments a flow rate of the fluid along each fluid delivery line of the one or more fluid delivery lines is measured via a flow meter located along each fluid delivery line.

Additionally or alternatively, in this or other embodiments the position of the one or more flow control valves is adjusted based on a comparison of the measured flow rate to the selected flow rate by the system controller.

Additionally or alternatively, in this or other embodiments the flow rate is measured by a flow meter located along each fluid delivery line between the pump and the flow control valve.

Additionally or alternatively, in this or other embodiments the pump is a variable speed pump.

Additionally or alternatively, in this or other embodiments a speed of the pump is varied to maintain the selected flow rate.

Additionally or alternatively, in this or other embodiments the fluid flow is cooled at a heat exchanger located along the recirculation line.

Additionally or alternatively, in this or other embodiments the pressure regulating valve and the one or more flow control valves are proportional solenoid valves.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments of the present disclosure relate to applications that have the need for fluid flow to be metered very accurately, with a fast response time, and over a large range of fluid flow rates and pressure differentials. In an exemplary embodiment, a fluid flow must be metered from an upstream reservoir at low pressure to a downstream reservoir at high pressure. The back pressure of the downstream reservoir can vary by a factor of 3.3 to 1 and the flow rate demand can vary by a factor of 90 to 1. In that exemplary case, the effective area turndown ratio is 170 to 1. Further, the fluid flow must be delivered accurately within 1% of the commanded flow rate and the system must respond to step changes in flow rate command with a settling time <1 s.

Figure 1:
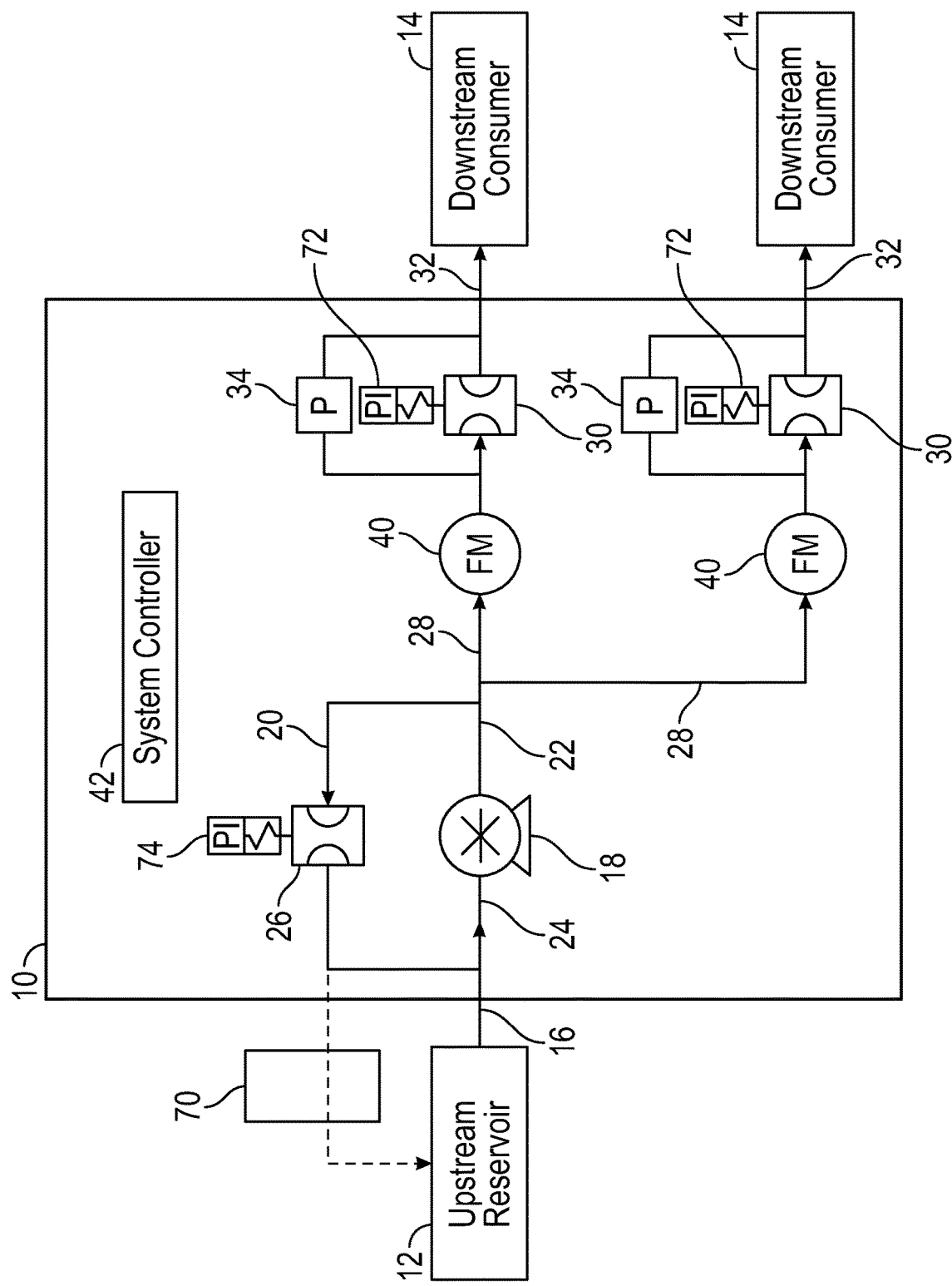
FIG. 1 is a schematic flow diagram of an embodiment of a dual valve fluid flow metering system.

Referring to FIG. 1, illustrated is an embodiment of a dual valve fluid flow metering system 10. The system 10 provides a fluid flow from an upstream fluid reservoir 12 or other fluid source, to a plurality of downstream consumers 14 or other users or uses of the fluid flow. While two downstream consumers 14 are illustrated in FIG. 1 and described herein, one skilled in the art will readily appreciate that other numbers of downstream consumers 14, such as one, three or more downstream consumers 14 may be serviced by the system 10.

The fluid flow is drawn from the fluid reservoir 12 along an input line 16 by a pump 18. In some embodiments, the pump 18 is a positive displacement pump operating at a fixed speed, while in other embodiments the pump 18 may be a variable speed pump. A recirculation line 20 connects a pump outlet 22 and a pump inlet 24. A pressure regulating valve 26 is located along the recirculation line 20. One or more fluid delivery lines 28 extend from the pump outlet 22 to the downstream consumers 14. In the embodiment shown in FIG. 1, there are two downstream consumers 14, so there are two fluid delivery lines 28, with each fluid delivery line 28 connecting the pump outlet 22 to a respective downstream consumer 14.

Figure 2:
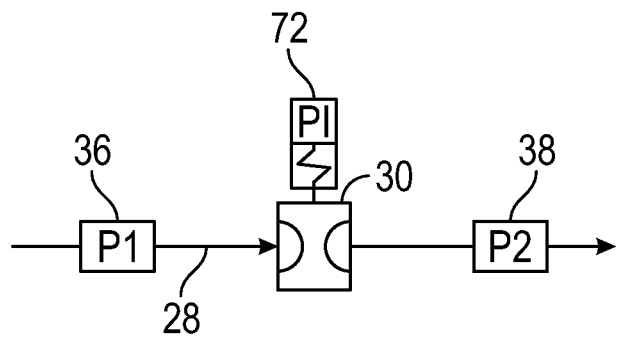
FIG. 2 is a schematic illustration of an embodiment of a pressure sensor arrangement in a dual valve fluid flow metering system.

The structure along each fluid delivery line 28 will now be described. Each fluid delivery line 28 includes a fluid control valve 30 disposed along its length upstream of a fluid outlet 32 to the respective downstream consumer 14. In some embodiments, the pressure regulating valve 26 and the flow control valves 30 are proportional solenoid valves, which may be identical or may be different sizes according to flow demands. A differential pressure sensor 34 measures a pressure drop across the fluid control valve 30. Alternatively, in an embodiment illustrated in FIG. 2, the pressure drop measurement may be obtained via a first pressure sensor 36 disposed upstream of the fluid control valve 30 and a second pressure sensor 38 disposed downstream of the fluid control valve 30.

Figure 3:
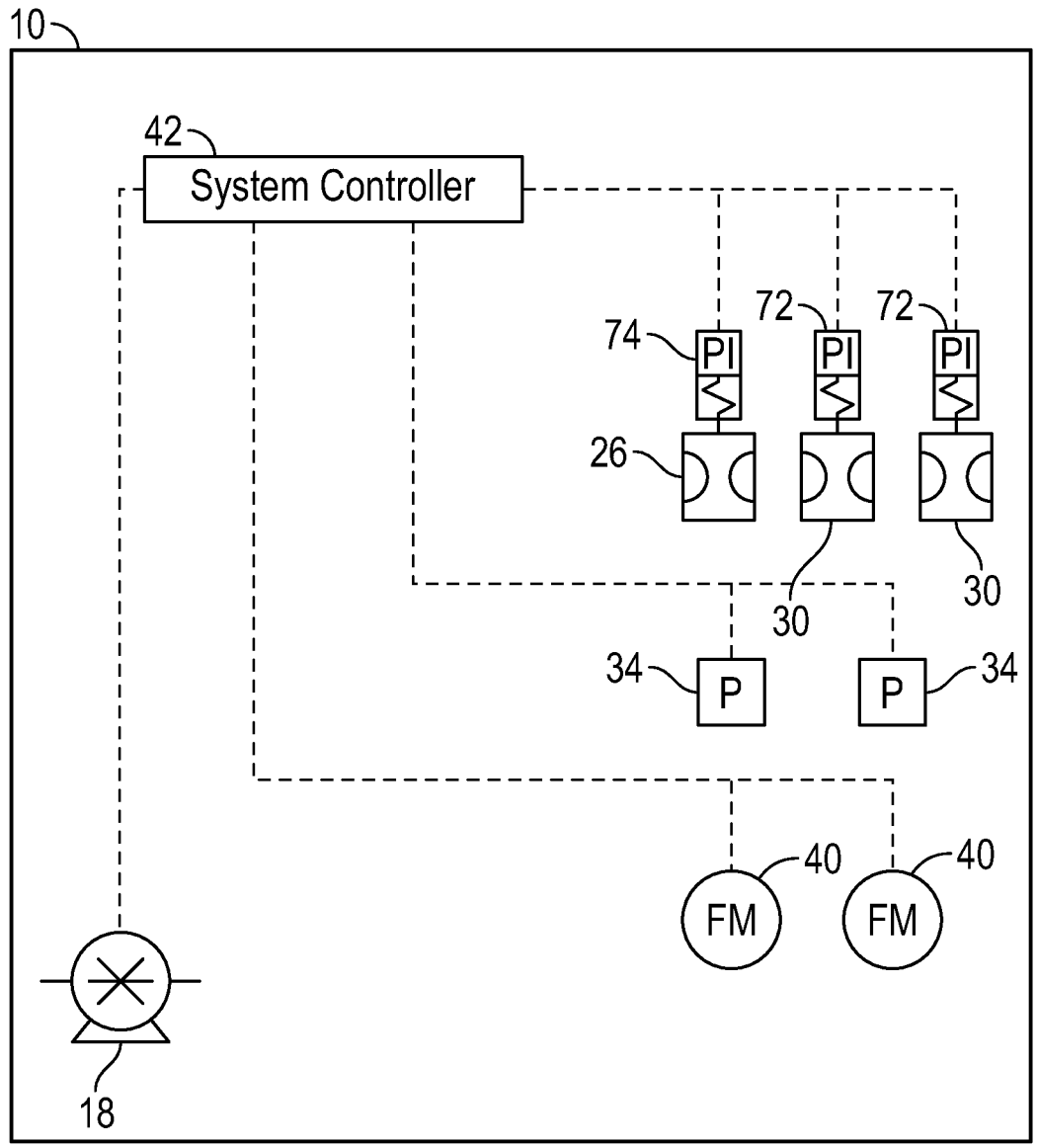
FIG. 3 is a schematic illustration of a control system connection to an embodiment of a dual valve fluid flow metering system.

Referring again to FIG. 1, a flow meter 40 is disposed along each fluid delivery line 28 and measures a flow rate through the flow control valve 30. In some embodiments, the flow meter 40 is located upstream of the flow control valve 30 such as shown in FIG. 1, while in other embodiments the flow meter is located downstream of the flow control valve 30. A system controller 42 is operably connected to the components of the system 10, as shown in FIG. 3. The system controller 42 is utilized to control the system 10 through two simultaneous feedback control loops. A first feedback loop utilizes the detected delta pressures from the delta pressure sensors 34 and adjusts a position of the pressure regulating valve 26 such that a delta pressure across the flow control valves 30 remains constant and reduces a range of required flow coefficient through the flow control valves 30. The fluid flow directed through the pressure regulating valve 26 is re-routed to the pump inlet 24 and/or to the reservoir 12. In some embodiments, the flow through the pressure regulating valve 26 may also be passed through a heat exchanger 70 for cooling to prevent overheating of the fluid flow. A second feedback loop utilizes a sensed flow rate through the flow meters 40 and adjusts the flow control valves 30 to provide a selected flow rate to the downstream consumers 14.

Figure 4:
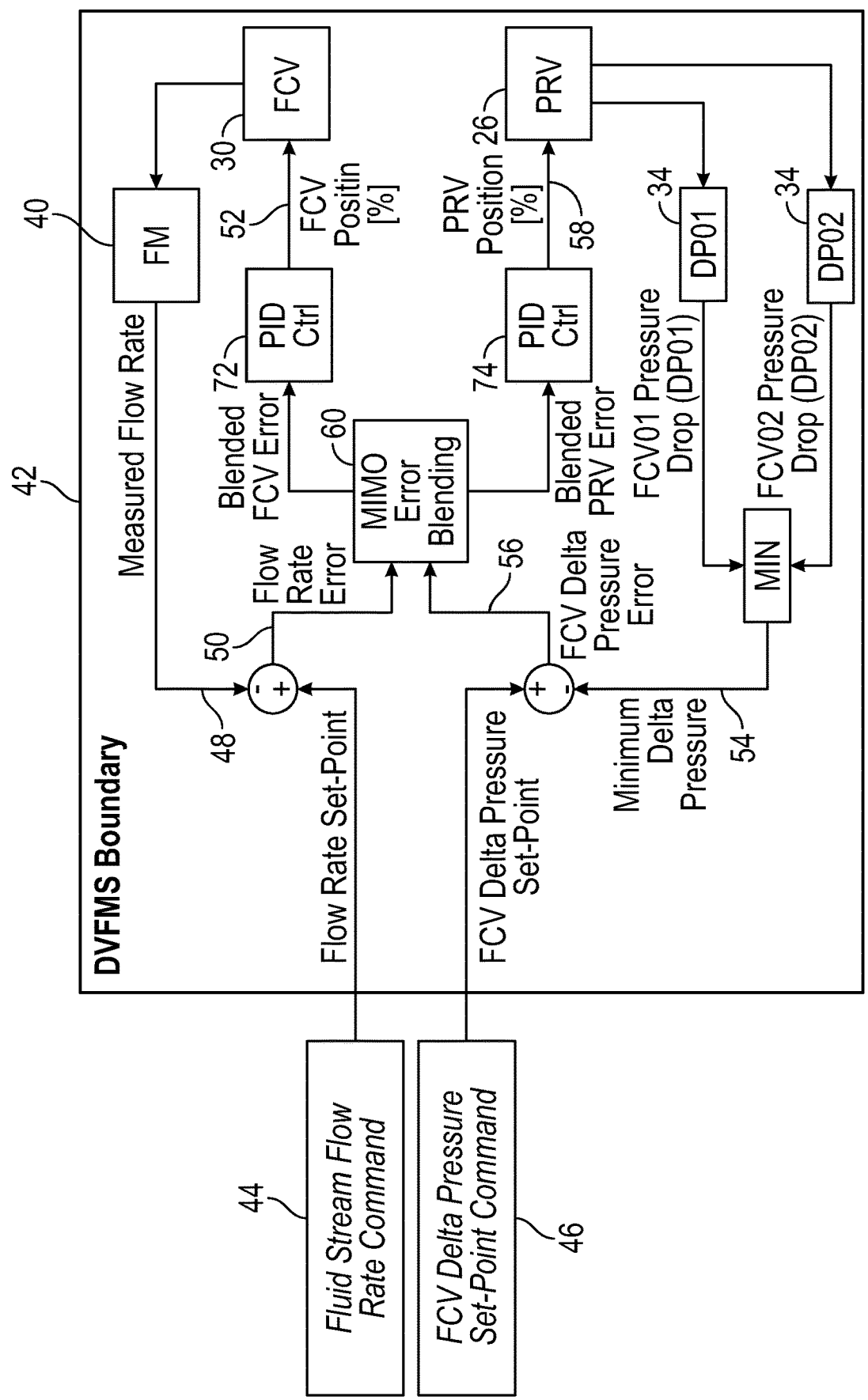
FIG. 4 is a schematic flow diagram of operation of an embodiment of a dual valve fluid flow metering system.

An exemplary flow diagram of operation of the system 10, and more specifically the system controller 42, is illustrated in FIG. 4. For each downstream consumer 14, the system controller 42 receives a flow rate set point 44 command and a delta pressure set point 46 command. The flow rate set point 44 is compared to a measured flow rate 48 from the respective flow meter 40 and a resulting flow rate error 50 is used by a flow control valve controller 72 to determine a flow control valve command 52 to adjust the flow control valve 30 to provide a flow rate to match the selected flow rate set point 44. The flow control valve 30 is then adjusted according to the flow control valve command 52. After adjustment of the flow control valve 40 is performed, the flow rate 48 is measured again by the flow meter 40 and compared to the flow rate set point 44. If necessary, the flow control valves 30 are adjusted again until the flow rate set point 44 is reached. In one embodiment, when a variable speed pump 18 is utilized, a pump speed may be actively varied based on the flow control valve command 52. This would reduce a turndown ratio burden on the flow control valves 30 by using the pump 18 to aid in controlling the flow rate, rather than solely relying on the flow control valves 30.

The delta pressure set point 46 is compared to a minimum measured delta pressure 54 from the delta pressure sensors 34. When there are multiple fluid delivery lines 28, the minimum measured delta pressure 54 is the lowest of the delta pressures measured by the delta pressure sensors 34 of each of the delta pressure sensors 34. A delta pressure error 56, a result of the comparison, is used by a pressure regulating valve controller 74 to determine a pressure regulating valve command 58 to adjust the pressure regulating valve 26 to provide a pressure drop to match the selected pressure drop set point 46. The pressure regulating valve 26 is then adjusted according to the pressure regulating valve command 58. After adjustment of the pressure regulating valve 26, the delta pressures are measured again, and a minimum measure delta pressure 54 is determined and compared to the delta pressure set point 46. If necessary, the pressure regulating valve 26 is adjusted again until the delta pressure set point 46 is reached. In some embodiments, the flow rate error 50 and the delta pressure error 56 are input into a multiple input multiple output (MIMO) error blending algorithm 60 to blend the flow rate error 50 and the delta pressure error 56 to improve stability by damping interaction between the two feedback loops.

In other fluid metering systems that utilize a pressure regulating valve and a flow control valve, the pressure regulating valve has a fixed pressure set point based on a maximum required delivery pressure under all operating conditions. This approach puts the burden of turndown ratio on the flow control valve to respond to changes in flow and back pressure (or pressure differential). It also requires that the pump always operates at the maximum pressure rise, which increases power consumption and fluid heating. In the present system 10, the fast acting, electronically controlled pressure regulating valve 26 adapts to changes in delta pressure set point 46 and flow rate set point 44, thus reducing turndown ratio burden on the flow control valves 30 and reducing power consumption. The control system 42 controls both the pressure regulating valve 26 and the flow control valves 30 in tandem to meter the fluid flow.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flow metering system, comprising:
   a pump configured to urge a fluid flow from a fluid source;
   a recirculation line disposed at the pump, a pressure regulating valve disposed along the recirculating line;
   two or more fluid delivery lines extending downstream of the pump to deliver the fluid flow to two or more fluid consumers;
   two or more flow control valves, a flow control valve of the two or more flow control valves disposed along each fluid delivery line of the two or more fluid delivery lines; and
   a system controller operably connected to the pressure regulating valve and the two or more flow control valves, the system controller configured to maintain a selected delta pressure and a selected flow rate of the fluid flow along each of the two or more fluid delivery lines by operation of the pressure regulating valve and the two or more flow control valves.

2. The flow metering system of claim 1, further comprising two or more delta pressure sensors, a delta pressure sensor of the two or more delta pressure sensors disposed at each flow control valve of the two or more flow control valves to measure a delta pressure across each flow control valve.

3. The flow metering system of claim 2, wherein the system controller is configured to adjust a position of the pressure regulating valve based on a comparison of the minimum measured delta pressure of the two or more delta pressure sensors to the selected delta pressure.

4. The flow metering system of claim 1, further comprising a flow meter disposed along each fluid delivery line of the two or more fluid delivery lines to measure a flow rate of the fluid along each fluid delivery line.

5. The flow metering system of claim 4, wherein the system controller is configured to adjust a position of the two or more flow control valves based on a comparison of the measured flow rate to the selected flow rate.

6. The flow metering system of claim 4, wherein the flow meter is disposed along each fluid delivery line between the pump and the flow control valve.

7. The flow metering system of claim 1, wherein the pump is a variable speed pump.

8. The flow metering system of claim 7, wherein the system controller is operably connected to the pump and is configured to vary a speed of the pump to maintain the selected flow rate.

9. The flow metering system of claim 1, further comprising a heat exchanger disposed along the recirculation line to cool the fluid flow in the recirculation line.

10. The flow metering system of claim 1, wherein the pressure regulating valve and the two or more flow control valves are proportional solenoid valves.

11. A method of metering a fluid flow between a fluid source and two or more fluid consumers, comprising:
    urging the fluid flow from the fluid source via a pump, a recirculation line disposed at the pump and including a pressure regulating valve;
    directing the fluid flow along two or more fluid delivery lines from the pump toward the two or more fluid consumers, each fluid delivery line including a flow control valve;
    adjusting a position of the pressure regulating valve via a system controller to maintain a selected delta pressure across each flow control valve of the two or more flow control valves; and
    adjusting a position of the two or more flow control valves via the system controller to maintain a selected flow rate of the fluid flow along the two or more fluid delivery lines.

12. The method of claim 11, further comprising measuring a delta pressure across each flow control valve via two or more delta pressure sensors, a delta pressure sensor of the two or more delta pressure sensors disposed at each flow control valve of the two or more flow control valves.

13. The method of claim 12, further comprising adjusting the position of the pressure regulating valve based on a comparison of the minimum measured delta pressure of the two or more delta pressure sensors to the selected delta pressure by the system controller.

14. The method of claim 11, further comprising measuring a flow rate of the fluid along each fluid delivery line of the two or more fluid delivery lines via a flow meter disposed along each fluid delivery line.

15. The method of claim 14, further comprising adjusting the position of the two or more flow control valves based on a comparison of the measured flow rate to the selected flow rate by the system controller.

16. The method of claim 14, further comprising measuring the flow rate by the flow meter disposed along each fluid delivery line between the pump and the flow control valve.

17. The method of claim 11, wherein the pump is a variable speed pump.

18. The method of claim 17, further comprising varying a speed of the pump to maintain the selected flow rate.

19. The method of claim 11, further comprising cooling the fluid flow at a heat exchanger disposed along the recirculation line.

20. The method of claim 11, wherein the pressure regulating valve and the two or more flow control valves are proportional solenoid valves.

* * * * *